United States Patent
Kimura (10) Patent No.: US 11,019,249 B2
(45) Date of Patent: May 25, 2021

(54) MAPPING THREE-DIMENSIONAL DEPTH MAP DATA ONTO TWO-DIMENSIONAL IMAGES

(71) Applicant: Magik Eye Inc., New York, NY (US)

(72) Inventor: Akiteru Kimura, Hachioji (JP)

(73) Assignee: Magik Eye Inc., New York, NY (US)

( * ) Notice: Subject to any disclaimer, the term of this patent is extended or adjusted under 35 U.S.C. 154(b) by 0 days.

(21) Appl. No.: 16/869,358

(22) Filed: May 7, 2020

(65) Prior Publication Data

US 2020/0358961 A1 Nov. 12, 2020

Related U.S. Application Data (60) Provisional application No. 62/846,696, filed on May 12, 2019.

(51) Int. Cl.
| | |
|---|---|
| *H04N 5/232* | (2006.01) |
| *G01B 11/02* | (2006.01) |
| *H04N 5/369* | (2011.01) |
| *H04N 17/00* | (2006.01) |

(52) U.S. Cl.
CPC ..... *H04N 5/232121* (2018.08); *G01B 11/026* (2013.01); *H04N 5/23296* (2013.01); *H04N 5/369* (2013.01); *H04N 17/002* (2013.01)

(58) Field of Classification Search
CPC ......... H04N 5/232121; H04N 5/23296; H04N 5/232; H04N 5/2226; H04N 5/3696; G01B 11/00; G01B 11/026; G06T 17/00; G06T 7/521; G06T 7/0018
See application file for complete search history.

(56) References Cited

U.S. PATENT DOCUMENTS

| | | |
|---|---|---|
| 4,914,460 A | 4/1990 | Caimi et al. |
| 5,699,444 A | 12/1997 | Palm |
| 5,730,702 A | 3/1998 | Tanaka et al. |

(Continued)

FOREIGN PATENT DOCUMENTS

| | | |
|---|---|---|
| CN | 101794065 A | 8/2010 |
| CN | 103196385 A | 7/2013 |

(Continued)

OTHER PUBLICATIONS

International Search Report and Written Opinion mailed in corresponding PCT/2020/031910 dated Aug. 20, 2020, 9 pages.

*Primary Examiner* — Hung H Lam
(74) *Attorney, Agent, or Firm* — Tong, Rea, Bentley & Kim, LLC (57) ABSTRACT

A 3D distance sensor projects a plurality of points of light onto a target. A 2D camera having a fixed position relative to the 3D distance sensor acquires a first image of the points on the target. A light receiving system of the 3D distance sensor acquires a second image of the points on the target. A set of 2D coordinates of a first point is associated with a distance coordinate of the first point to form a single set of coordinates for the first point. The set of 2D coordinates is obtained from the first image, and the distance coordinate is obtained from the second image. A relational expression is derived from the single set of coordinates and describes a relationship between a distance of the light receiving system to the target and a position of the first point on an image sensor of the 2D camera.

20 Claims, 8 Drawing Sheets

(56) References Cited

U.S. PATENT DOCUMENTS

| | | |
|---|---|---|
| 5,870,136 A | 2/1999 | Fuchs et al. |
| 5,980,454 A | 11/1999 | Broome |
| 6,038,415 A | 3/2000 | Nishi et al. |
| 6,442,476 B1 | 8/2002 | Poropat |
| 6,668,082 B1 | 12/2003 | Davison et al. |
| 6,937,350 B2 | 8/2005 | Shirley |
| 7,191,056 B2 | 3/2007 | Costello et al. |
| 7,193,645 B1 | 3/2007 | Aagaard et al. |
| 7,375,803 B1 | 5/2008 | Bamji |
| 7,589,825 B2 | 9/2009 | Orchard et al. |
| 9,098,909 B2 | 8/2015 | Nomura |
| 9,488,757 B2 | 11/2016 | Mukawa |
| 9,536,339 B1* | 1/2017 | Worley .................. G06T 15/00 |
| 9,686,539 B1 | 6/2017 | Zuliani et al. |
| 9,888,225 B2 | 2/2018 | Znamensky et al. |
| 9,986,208 B2 | 5/2018 | Chao et al. |
| 2003/0071891 A1 | 4/2003 | Geng |
| 2004/0167744 A1 | 8/2004 | Lin et al. |
| 2006/0044546 A1 | 3/2006 | Lewin et al. |
| 2006/0055942 A1 | 3/2006 | Krattiger |
| 2006/0290781 A1 | 12/2006 | Hama |
| 2007/0091174 A1 | 4/2007 | Kochi et al. |
| 2007/0165243 A1 | 7/2007 | Kang et al. |
| 2007/0206099 A1 | 9/2007 | Matsuo |
| 2010/0007719 A1* | 1/2010 | Frey .................. G06T 7/593 348/46 |
| 2010/0149315 A1 | 6/2010 | Qu et al. |
| 2010/0223706 A1 | 9/2010 | Becker et al. |
| 2010/0238416 A1 | 9/2010 | Kuwata |
| 2011/0188054 A1 | 8/2011 | Petronius et al. |
| 2012/0051588 A1 | 3/2012 | Mceldowney |
| 2012/0056982 A1 | 3/2012 | Katz et al. |
| 2012/0062758 A1 | 3/2012 | Devine et al. |
| 2012/0113252 A1 | 5/2012 | Yang et al. |
| 2012/0219699 A1 | 8/2012 | Pettersson |
| 2012/0225718 A1 | 9/2012 | Zhang |
| 2012/0236288 A1 | 9/2012 | Stanley |
| 2012/0236317 A1 | 9/2012 | Nomura |
| 2013/0076865 A1* | 3/2013 | Tateno .................. G06T 7/75 348/46 |
| 2013/0088575 A1 | 4/2013 | Park et al. |
| 2013/0155417 A1 | 6/2013 | Ohsawa |
| 2013/0242090 A1 | 9/2013 | Yoshikawa |
| 2013/0307933 A1 | 11/2013 | Znamensky et al. |
| 2014/0000520 A1 | 1/2014 | Bareket |
| 2014/0009571 A1 | 1/2014 | Geng |
| 2014/0016113 A1 | 1/2014 | Holt et al. |
| 2014/0036096 A1 | 2/2014 | Sterngren |
| 2014/0071239 A1 | 3/2014 | Yokota |
| 2014/0085429 A1 | 3/2014 | Hébert |
| 2014/0125813 A1 | 5/2014 | Holz |
| 2014/0207326 A1 | 7/2014 | Murphy |
| 2014/0241614 A1 | 8/2014 | Lee |
| 2014/0275986 A1 | 9/2014 | Vertikov |
| 2014/0320605 A1 | 10/2014 | Johnson |
| 2015/0009301 A1 | 1/2015 | Ribnick et al. |
| 2015/0012244 A1 | 1/2015 | Oki |
| 2015/0077764 A1 | 3/2015 | Braker et al. |
| 2015/0131054 A1 | 5/2015 | Wuellner et al. |
| 2015/0016003 A1 | 6/2015 | Terry et al. |
| 2015/0171236 A1 | 6/2015 | Murray |
| 2015/0248796 A1 | 9/2015 | Iyer et al. |
| 2015/0268399 A1 | 9/2015 | Futterer |
| 2015/0288956 A1 | 10/2015 | Mallet et al. |
| 2015/0323321 A1 | 11/2015 | Oumi |
| 2015/0336013 A1 | 11/2015 | Stenzier et al. |
| 2015/0381907 A1 | 12/2015 | Boetliger et al. |
| 2016/0022374 A1 | 1/2016 | Haider |
| 2016/0117561 A1 | 4/2016 | Miyazawa et al. |
| 2016/0128553 A1 | 5/2016 | Geng |
| 2016/0157725 A1 | 6/2016 | Munoz |
| 2016/0178915 A1 | 6/2016 | Mor et al. |
| 2016/0249810 A1 | 9/2016 | Darty et al. |
| 2016/0261854 A1 | 9/2016 | Ryu et al. |
| 2016/0267682 A1 | 9/2016 | Yamashita |
| 2016/0288330 A1 | 10/2016 | Konolige |
| 2016/0327385 A1 | 11/2016 | Kimura |
| 2016/0328854 A1* | 11/2016 | Kimura ................ G01B 11/026 |
| 2016/0334939 A1 | 11/2016 | Dawson et al. |
| 2016/0350594 A1 | 12/2016 | McDonald |
| 2016/0379368 A1* | 12/2016 | Sakas .................... A61B 34/20 382/132 |
| 2017/0098305 A1* | 4/2017 | Gossow .................... G06T 7/80 |
| 2017/0102461 A1 | 4/2017 | Tezuka et al. |
| 2017/0221226 A1 | 8/2017 | Shen et al. |
| 2017/0270689 A1 | 9/2017 | Messely et al. |
| 2017/0284799 A1 | 10/2017 | Wexler et al. |
| 2017/0307544 A1 | 10/2017 | Nagata |
| 2017/0347086 A1 | 11/2017 | Watanabe |
| 2018/0010903 A1* | 1/2018 | Takao .................... G01B 11/25 |
| 2018/0011194 A1 | 1/2018 | Masuda et al. |
| 2018/0073863 A1 | 3/2018 | Watanabe |
| 2018/0080761 A1 | 3/2018 | Takao et al. |
| 2018/0143018 A1 | 5/2018 | Kimura |
| 2018/0156609 A1 | 6/2018 | Kimura |
| 2018/0227566 A1 | 8/2018 | Price et al. |
| 2018/0249142 A1 | 8/2018 | Hicks et al. |
| 2018/0324405 A1 | 11/2018 | Thirion |
| 2018/0329038 A1 | 11/2018 | Lin et al. |
| 2018/0357871 A1 | 12/2018 | Siminoff |
| 2019/0107387 A1 | 4/2019 | Kimura |
| 2019/0108743 A1 | 4/2019 | Kimura |
| 2019/0122057 A1 | 4/2019 | Kimura |
| 2019/0295270 A1 | 9/2019 | Kimura |
| 2019/0297241 A1 | 9/2019 | Kimura |
| 2019/0377088 A1 | 12/2019 | Kimura |
| 2020/0003556 A1 | 1/2020 | Kimura |
| 2020/0051268 A1 | 2/2020 | Kimura |
| 2020/0182974 A1 | 6/2020 | Kimura |
| 2020/0236315 A1 | 7/2020 | Kimura |

FOREIGN PATENT DOCUMENTS

| | | |
|---|---|---|
| CN | 103559735 A | 2/2014 |
| CN | 104160243 A | 11/2014 |
| EP | 0358628 A2 | 3/1990 |
| JP | H045112 A | 2/1992 |
| JP | H0961126 A | 3/1997 |
| JP | 4485365 B2 | 2/2006 |
| JP | 2006-313116 A | 11/2006 |
| JP | 2007-10346 A | 1/2007 |
| JP | 2007-187581 A | 7/2007 |
| JP | 2007-315864 A | 12/2007 |
| JP | 2010-091855 A | 4/2010 |
| JP | 2010-101683 A | 5/2010 |
| JP | 2010-256182 A | 11/2010 |
| JP | 2012-047500 A | 3/2012 |
| JP | 2014-020978 A | 2/2014 |
| JP | 2014-511590 A | 5/2014 |
| JP | 2014-122789 A | 7/2014 |
| JP | 6038415 B1 | 12/2016 |
| JP | 6241793 B2 | 12/2017 |
| KR | 10-2013-0000356 A | 1/2013 |
| KR | 10-2013-0037152 A | 4/2013 |
| KR | 10-2015-0101749 A | 9/2015 |
| KR | 10-2016-0020323 | 2/2016 |
| KR | 10-2017-0005649 A | 1/2017 |
| KR | 10-2017-0094968 | 8/2017 |
| TW | I320480 B | 2/2010 |
| TW | I451129 B | 4/2012 |
| WO | WO 2012/081506 A1 | 6/2012 |
| WO | WO 2013/145164 | 10/2013 |
| WO | WO 2014/106843 A2 | 7/2014 |
| WO | WO 2014/131064 | 8/2014 |
| WO | WO 2015/166915 A1 | 11/2015 |

\* cited by examiner

MAPPING THREE-DIMENSIONAL DEPTH MAP DATA ONTO TWO-DIMENSIONAL IMAGES

CROSS REFERENCE TO RELATED APPLICATIONS

This application claims the priority of U.S. Provisional Patent Application Ser. No. 62/846,696, filed May 12, 2019, which is herein incorporated by reference in its entirety.

BACKGROUND

U.S. patent application Ser. Nos. 14/920,246, 15/149,323, and 15/149,429 describe various configurations of distance sensors. Such distance sensors may be useful in a variety of applications, including security, gaming, control of unmanned vehicles, operation of robotic or autonomous appliances, and other applications.

The distance sensors described in these applications include projection systems (e.g., comprising lasers, diffractive optical elements, and/or other cooperating components) which project beams of light in a wavelength that is substantially invisible to the human eye (e.g., infrared) into a field of view. The beams of light spread out to create a pattern (of dots, dashes, or other artifacts) that can be detected by an appropriate light receiving system (e.g., lens, image capturing device, and/or other components). When the pattern is incident upon an object in the field of view, the distance from the sensor to the object can be calculated based on the appearance of the pattern (e.g., the positional relationships of the dots, dashes, or other artifacts) in one or more images of the field of view, which may be captured by the sensor's light receiving system. The shape and dimensions of the object can also be determined.

For instance, the appearance of the pattern may change with the distance to the object. As an example, if the pattern comprises a pattern of dots, the dots may appear closer to each other when the object is closer to the sensor, and may appear further away from each other when the object is further away from the sensor.

SUMMARY

In one example, a method performed by a processing system includes controlling a three-dimensional distance sensor to project a pattern of light onto a target surface, wherein the pattern of light comprises a plurality of points of light, controlling a two-dimensional camera to acquire a first image of the pattern of light on the target surface, wherein the two-dimensional camera has a fixed position relative to the three-dimensional distance sensor, controlling a light receiving system of the three-dimensional distance sensor to acquire a second image of the pattern of light on the target surface, associating a set of two-dimensional coordinates of a first point of light of the plurality of points of light with a distance coordinate of a set of three-dimensional coordinates of the first point of light to form a single set of coordinates for the first point of light, wherein the set of two-dimensional coordinates is obtained from the first image, and wherein the set of three-dimensional coordinates is obtained from the second image, and deriving a relational expression from the single set of coordinates, wherein the relational expression describes a relationship between a distance of the light receiving system to the target surface and a position of the first point of light on an image sensor of the two-dimensional camera.

In another example, a non-transitory machine-readable storage medium is encoded with instructions executable by a processor. When executed, the instructions cause the processor to perform operations including controlling a three-dimensional distance sensor to project a pattern of light onto a target surface, wherein the pattern of light comprises a plurality of points of light, controlling a two-dimensional camera to acquire a first image of the pattern of light on the target surface, wherein the two-dimensional camera has a fixed position relative to the three-dimensional distance sensor, controlling a light receiving system of the three-dimensional distance sensor to acquire a second image of the pattern of light on the target surface, associating a set of two-dimensional coordinates of a first point of light of the plurality of points of light with a distance coordinate of a set of three-dimensional coordinates of the first point of light to form a single set of coordinates for the first point of light, wherein the set of two-dimensional coordinates is obtained from the first image, and wherein the set of three-dimensional coordinates is obtained from the second image, and deriving a relational expression from the single set of coordinates, wherein the relational expression describes a relationship between a distance of the light receiving system to the target surface and a position of the first point of light on an image sensor of the two-dimensional camera.

In another example, an apparatus includes a processor and a non-transitory machine-readable storage medium encoded with instructions executable by the processor. When executed, the instructions cause the processor to perform operations including controlling a three-dimensional distance sensor to project a pattern of light onto a target surface, wherein the pattern of light comprises a plurality of points of light, controlling a two-dimensional camera to acquire a first image of the pattern of light on the target surface, wherein the two-dimensional camera has a fixed position relative to the three-dimensional distance sensor, controlling a light receiving system of the three-dimensional distance sensor to acquire a second image of the pattern of light on the target surface, associating a set of two-dimensional coordinates of a first point of light of the plurality of points of light with a distance coordinate of a set of three-dimensional coordinates of the first point of light to form a single set of coordinates for the first point of light, wherein the set of two-dimensional coordinates is obtained from the first image, and wherein the set of three-dimensional coordinates is obtained from the second image, and deriving a relational expression from the single set of coordinates, wherein the relational expression describes a relationship between a distance of the light receiving system to the target surface and a position of the first point of light on an image sensor of the two-dimensional camera.

DETAILED DESCRIPTION

The present disclosure broadly describes a method, computer readable medium, and apparatus for mapping three-dimensional (3D) depth map data onto two-dimensional (2D) images. As discussed above, distance sensors such as those described in U.S. patent application Ser. Nos. 14/920,246, 15/149,323, and 15/149,429 determine the distance to an object (and, potentially, the shape and dimensions of the object) by projecting beams of light that spread out to create a pattern (e.g., of dots, dashes, or other artifacts) in a field of view that includes the object. The beams of light may be projected from one or more laser light sources which emit light of a wavelength that is substantially invisible to the human eye, but which is visible to an appropriate detector (e.g., of the light receiving system). The 3D distance to the object may then be calculated based on the appearance of the pattern to the detector.

The calculated 3D distance may be used for a variety of applications, including security (e.g., facial recognition to gain access to secured locations and/or resources), navigation (e.g., for unmanned vehicles), and other applications. 3D depth map information, such as might be obtained from the 3D distance calculations, can also be combined with 2D image data in order to enable more intuitive depth displays. For instance, the outline of an object or a curved surface may be difficult to discern when only 3D depth map information is available; however, when mapped to 2D image information of the same object or curved surface, the outline may be more accurately identified and reproduced.

Conventional techniques for combining 3D depth map information with 2D images have generally relied on the use of stereo cameras. For instance, the stereo cameras may be used to detect a feature point on an object such as a checkerboard. The relative positional relationship between the imaging rays of the two cameras may be known prior to the feature point detection, e.g., through calibration. In this case, the 3D position of the object is then calculated by solving equations that relate the 2D image position of the object and the imaging light position.

Although this technique may work well when the feature point is easily detected, it is less reliable when the feature point cannot be easily detected. Moreover, the depth calculation tends to be very complex, as the calculation involves a number of steps, many of which may rely on asymptotic and/or approximation calculations which may be prone to error. If the 2D camera specification is multi-valued (e.g., by zooming and/or focusing), or the rate of change is quick, the depth calculation may be complicated even further.

Examples of the present disclosure provide a way to map 3D depth map data onto 2D images that is not influenced by the presence of feature points on an object being imaged. Instead, examples of the disclosure leverage the direct relationship between the depth map information and the 2D image using the projection beams that a 3D distance sensor uses for ranging. Thus, in one example, the 3D depth map is obtained using beam projection, e.g., by a 3D distance sensor.

In further examples, a system comprising a 3D distance sensor and a 2D camera may be calibrated to determine the relationship between the depth map information and the 2D image using a fluorescent target (e.g., a target made of a material that emits fluorescence when excited by infrared light).

It should be noted that the use of terms such as "first," "second," "third," and so on, does not necessarily imply that examples of the present disclosure require a certain number of elements or items. For instance, a reference to a "third image" does not necessarily imply that a "first image" and a "second image" exist. Rather, such terminology may be used herein to differentiate between elements or items of the same type (e.g., to distinguish between two or more different images).

Figure 1:
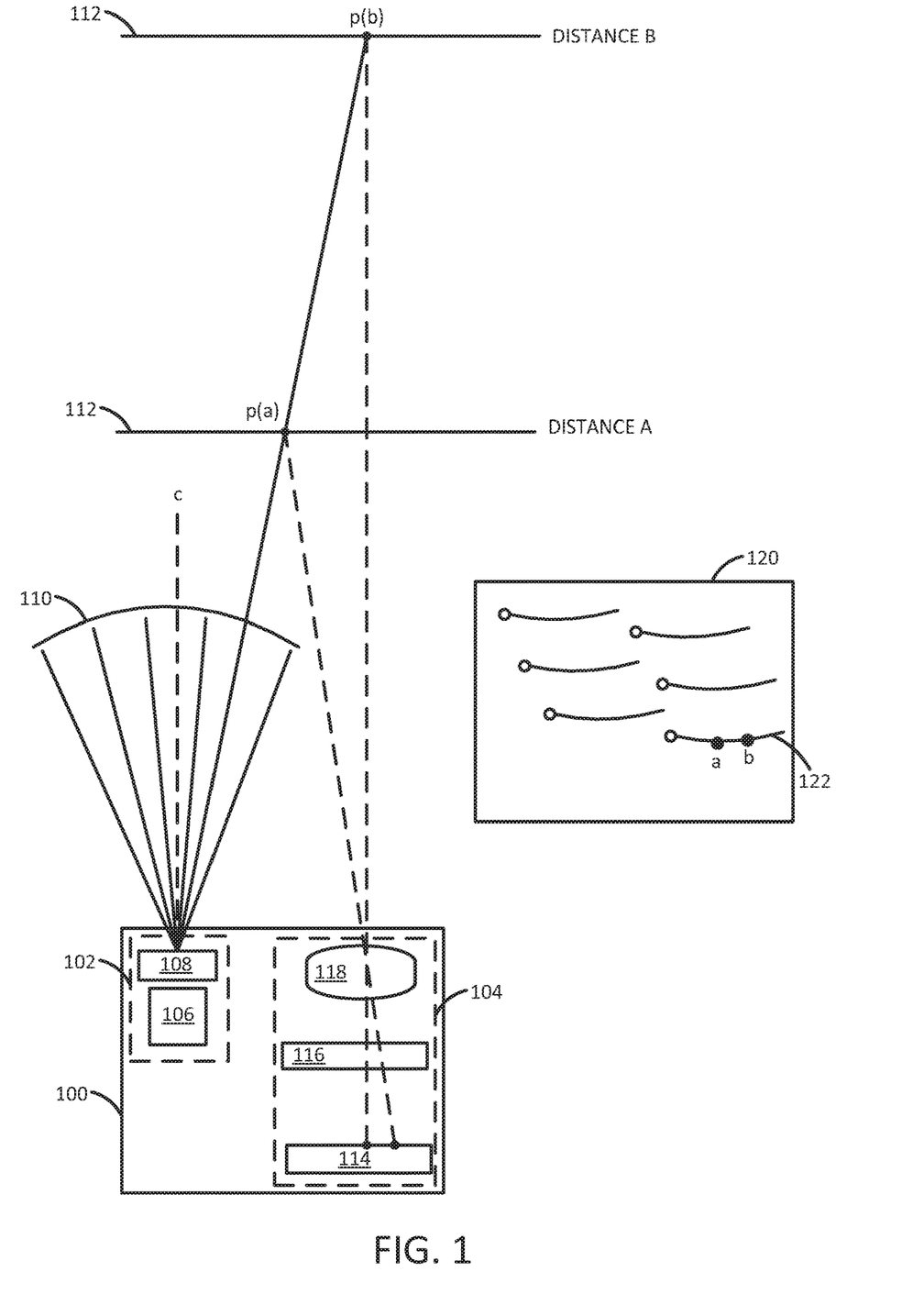
FIG. 1 illustrates a side view of an example distance sensor.

FIG. 1 illustrates a side view of an example distance sensor 100, such as any of the sensors described above. As shown in FIG. 1, the distance sensor 100 may generally comprise a light projecting system 102 and a light receiving system 104.

The light projecting system 102 may generally comprise a laser emitter 106 and a diffractive optical element (DOE) 108. The laser emitter 106 may comprise a laser light emitting diode (LED) that emits a beam of light in a wavelength that is substantially invisible to the human eye (e.g., infrared light). In one example, the laser emitter 106 comprises a vertical cavity surface emitting laser (VCSEL).

The DOE 108 may comprise an optical component such as a grating, a holographic film, a conical mirror, or the like that is positioned to split the beam of light emitted by the laser emitter 106 into a plurality of beams of light 110. Although FIG. 1 illustrates a single laser emitter 106 and DOE 108 pair, it should be noted that the light projecting system may comprise any number of laser emitter/DOE pairs. For instance, a plurality of laser emitter/DOE pairs may be arranged around the light receiving system 104, e.g., such that the light receiving system 104 is positioned in the center of the plurality of laser emitter/DOE pairs. In this case, each laser emitter/DOE pair of the plurality of laser emitter/DOE pairs may be configured in a manner similar to the laser emitter 106 and DOE 108 illustrated in FIG. 1.

In one example, the plurality of beams of light 110 fans out in a plurality of different directions from a central axis C. The angles between each pair of beams in the plurality of beams of light 110 may be equal. When the plurality of beams of light 110 is incident upon a surface 112, each beam may create an artifact such as a dot, a dash, or the like on the surface 112. Collectively, the artifacts created by the plurality of beams of light 110 form the above-described pattern from which the distance to the object can be calculated. For instance, the pattern may comprise a grid in which a plurality of artifacts are arranged in a plurality of rows and columns.

At least a portion of the pattern (e.g., at least some of the artifacts creating the pattern) may be detected by the light receiving system 104, which may comprise a camera that is configured to detect light in the wavelength of the light emitted by the light projecting system 102. For instance, the light receiving system 104 may generally comprise an image sensor 114 (e.g., a 3D image sensor), a bandpass filter 116, and a lens 118. Portions of the plurality of beams of light 110 may reflect off of the surface 112 and pass through the lens 118 of the light receiving system to the bandpass filter 116. The bandpass filter may be configured to allow light of predefined wavelengths (e.g., infrared) to pass through to the image sensor 114, while filtering out all other wavelengths. The image sensor 114 may be an active-pixel sensor (APS) comprising a plurality of pixel sensor units, where each pixel sensor unit includes a photodetector and at least one active transistor. The pixel sensor units may absorb photons of the light that passes through the bandpass filter 116. In this way, the image sensor 114 may generate a 3D image of the surface 112.

As described above, the appearance of the pattern created on the surface 112 by the plurality of beams of light 110 may change with the distance to the surface 112. As an example, if the pattern comprises a pattern of dots, the dots may appear closer to each other when the surface 112 is closer to the distance sensor 100, and may appear further away from each other when the surface 112 is further away from the distance sensor 100. Thus, the trajectories (i.e., moving ranges) of the dots may appear closer together or further away from each other.

The trajectory of a dot is determined by the positional relationship between the distance sensor's light projecting system 102 and the light receiving system 104 in the planar (e.g., lateral) direction and the height direction (e.g., the direction perpendicular to the lateral direction). The trajectory of a dot may appear as a radial pattern or a line (as illustrated by the inset 120 of FIG. 1) and describes the movement of the dot as the distance between the distance sensor 100 and an object onto which the projection pattern is projected (e.g., surface 112) varies. More specifically, the trajectory of a dot describes the dot's movement relative to the distance sensor's image sensor 114 with variations in distance.

For instance, inset 120 illustrates example trajectories for a plurality of artifacts that may be created on the surface 112 by the plurality of beams of light 110. Taking trajectory 122 as an example, the trajectory 122 shows the physical range within which a corresponding dot (or other artifact) p may move as the distance between the distance sensor 100 and the surface 112 changes. As shown by the trajectory 122, the light receiving system 104 may view the point p at a first position p(a) when the distance between the distance sensor 100 and the surface 112 is equal to Distance A and may view the point p at a second position p(b) when the distance between the distance sensor 100 and the surface 112 is equal to Distance B.

Figure 2:
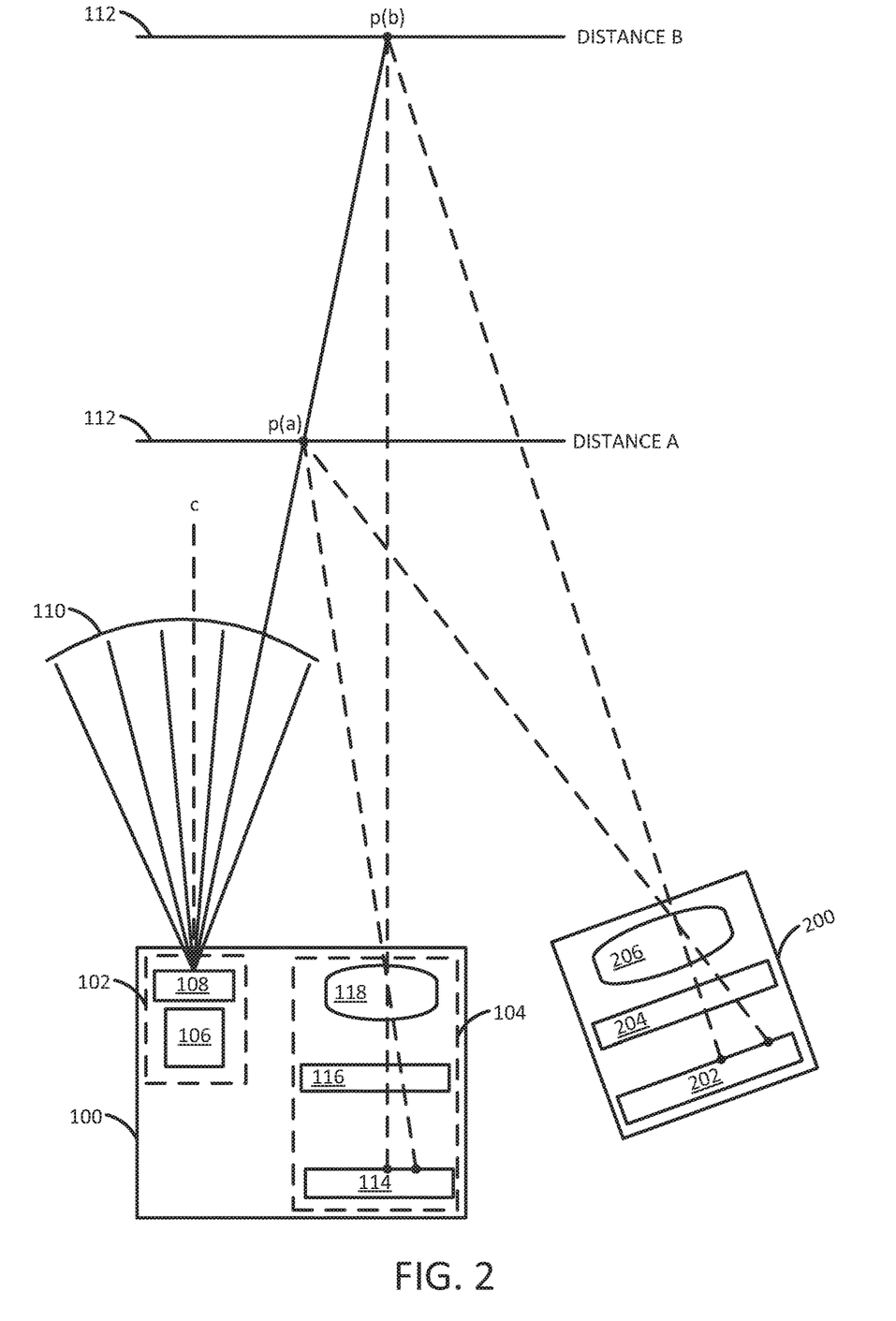
FIG. 2 illustrates a side view of an example system including the three-dimensional distance sensor of FIG. 1 and a two-dimensional camera.

FIG. 2 illustrates a side view of an example system including the three-dimensional distance sensor 100 of FIG. 1 and a two-dimensional camera 200. The distance sensor 100 may be the same distance sensor 100 illustrated in FIG. 1; thus, the same reference numerals are used to refer to the same components in FIG. 2.

The 2D camera 200 may generally comprise an image sensor 202 (e.g., a 2D image sensor), a cut-off filter 204, and a lens 206. Light that reflects off of a surface (e.g., surface 112) may pass through the lens 206 to the cut-off filter 204. In one example, the cut-off filter is an infrared cut-off filter (i.e., a filter that reflects infrared wavelengths, while allowing other wavelengths of light to pass through). The image sensor 202 may be an active-pixel sensor (APS) comprising a plurality of pixel sensor units, where each pixel sensor unit includes a photodetector and at least one active transistor. Photons of the light that pass through the cut-off filter 204 may be absorbed by the pixel sensor units of the image sensor 202, which may generate a corresponding 2D image of the surface 112.

As discussed above, the light emitted by the light projecting system 102 of the 3D distance sensor 100 may be infrared light, and the light receiving system 104 of the distance sensor 100 may block wavelengths outside of the infrared range in order to minimize the influence of external light noise on distance measurements. However, if the 2D camera 200 includes an infrared cut-off filter, then the 2D camera 200 may be unable to detect the points (e.g., including the point p(a)/p(b)) of the projection pattern created by the 3D distance sensor 100.

Thus, for calibration purposes (e.g., in order to calibrate the system of FIG. 2 so that the relationship between the 3D depth map information and the 2D image can be determined), in one example, the surface 112 may comprise a fluorescent material. In particular, the surface 112 may be formed from an infrared fluorescent material, i.e., a material that emits fluorescence when excited by infrared light. In this case, when a point p is created on the surface 112 by a beam of infrared light, the location on the surface 112 at which the point p appears will emit fluorescence that can be detected by the image sensor 202 of the 2D camera 200.

Consequently, the 3D distance sensor 100 may calculate the position of the point p in a three-dimensional (x, y, z) coordinate space based on the reflected infrared light. The 2D camera 200 may simultaneously calculate the position of the point p in a two-dimensional (u, v) image sensor coordinate system based on the emission of fluorescence by the surface 112. The 3D (x, y, z) coordinates can then be mapped directly to the 2D (u, v) coordinates, giving the positional relationship between the light receiving system 104 of the 3D distance sensor 100 and the 2D camera 200. In other words, the 2D position of the point p (in a 2D image) may be mapped to the same point's 3D object distance. This mapping may subsequently allow for the 2D positions of other points to be mapped to the 3D object distances of the other points.

In one example, the fluorescent surface 112 has a size that is smaller than a size of the field of view of the 3D distance sensor 100 and a field of view of the 2D camera 200. The fluorescent surface 112 may also be shaped to improve the efficiency of the calibration process. For instance, a shape such as a rectangle may be easy to recognize, while a planar surface may simplify the distance relationship to be calculated.

Figure 3:
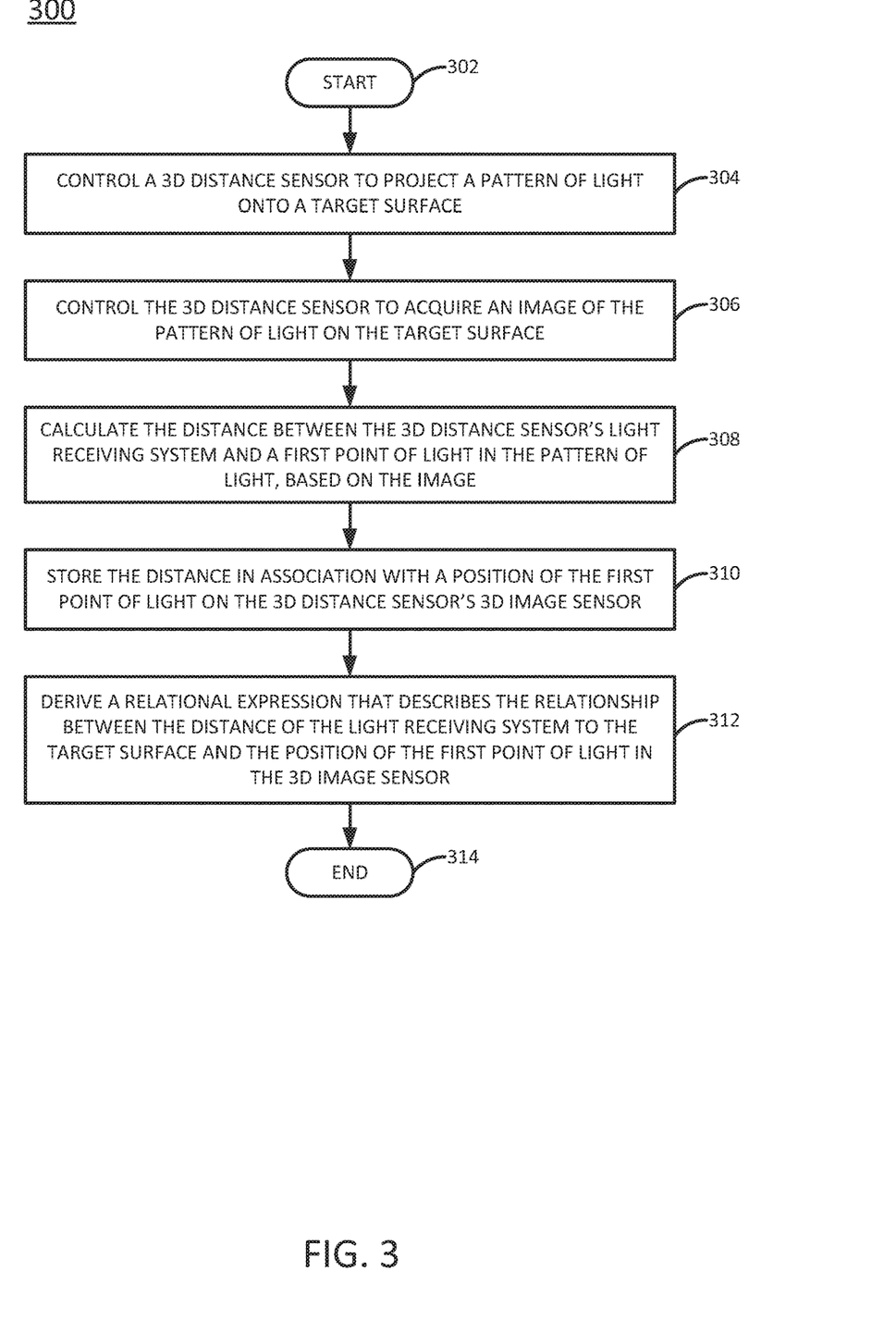
FIG. 3 is a flow diagram illustrating one example of a method for calibrating a three-dimensional distance sensor, such as the distance sensor illustrated in FIG. 1 or FIG. 2, according to the present disclosure.

FIG. 3 is a flow diagram illustrating one example of a method 300 for calibrating a three-dimensional distance sensor, such as the distance sensor 100 illustrated in FIG. 1 or FIG. 2, according to the present disclosure. The method 300 may be performed, for example, by a processor that is in communication with (and receives image data from) the 3D distance sensor and the 2D camera, such as the processor 702 illustrated in FIG. 7. Alternatively, the method 300 may be performed by a processor that is part of the 3D distance sensor or the 2D camera. For the sake of example, the method 300 is described as being performed by a processing system.

The method 300 may begin in step 302. In step 304, the processing system may control a 3D distance sensor to project a pattern of light onto a target surface. As discussed above, the pattern of light may comprise a pattern of points of light (or other projection artifacts, such as dots, dashes, x's, or the like), where each point of light may be created by a respective beam of light that is emitted by the light projecting system of the 3D distance sensor. In particular, each point of light may be created when the respective beam of light is incident upon the target surface. The beams of light may comprise beams of infrared light (or another wavelength of light that is substantially invisible to the human eye, but is visible to the light receiving system of the 3D distance sensor).

The target surface used in step 304 may comprise a three-dimensional target, e.g., such that different portions of the target surface may reside at different distances from the light receiving system of the 3D distance sensor.

In step 306, the processing system may control the 3D distance sensor to acquire an image of the pattern of light on the target surface. As discussed above, in one example, the 3D distance sensor may include a light receiving system including an infrared bandpass filter and a 3D image sensor. The light receiving system may capture an image of the pattern of light as projected onto the target surface and may transmit this image to the processing system (e.g., via a wired or wireless connection).

In step 308, the processing system may calculate the distance between the light receiving system of the 3D distance sensor and a first point of light (of the pattern of light), based on the image. In one example, the distance may be calculated using any of the techniques discussed in U.S. patent application Ser. Nos. 14/920,246, 15/149,323, and 15/149,429. In a further example, the distance may be calculated in this manner for two or more points of light (e.g., for the first point of light and at least a second point of light).

In step 310, the processing system may store the distance calculated in step 308 in association with a position of the first point of light on the 3D image sensor of the 3D distance sensor. Where the distance calculated in step 308 has been calculated for a plurality of points of light, the distances and corresponding image sensor positions may be stored for all points of light of the plurality of points of light.

In step 312, the processing system may derive a relational expression that describes the relationship between the distance of the 3D distance sensor's light receiving system to the target surface (where this distance may change continuously) and the position of the first point of light on the 3D image sensor. In one example, as discussed above, the distances between the light receiving system and a plurality of points of light may be calculated in step 308. In this case, a plurality of relational expressions may be derived in step 312. For instance, where the 3D distance sensor's light projecting system emits n beams of light (n>1), the relational expressions for each beam (e.g., for each point of light created by one of the beams) may be derived and stored in a memory that is accessible to the processing system, such that n distinct relational expressions are derived.

The method 300 may end in step 314.

Figure 8:
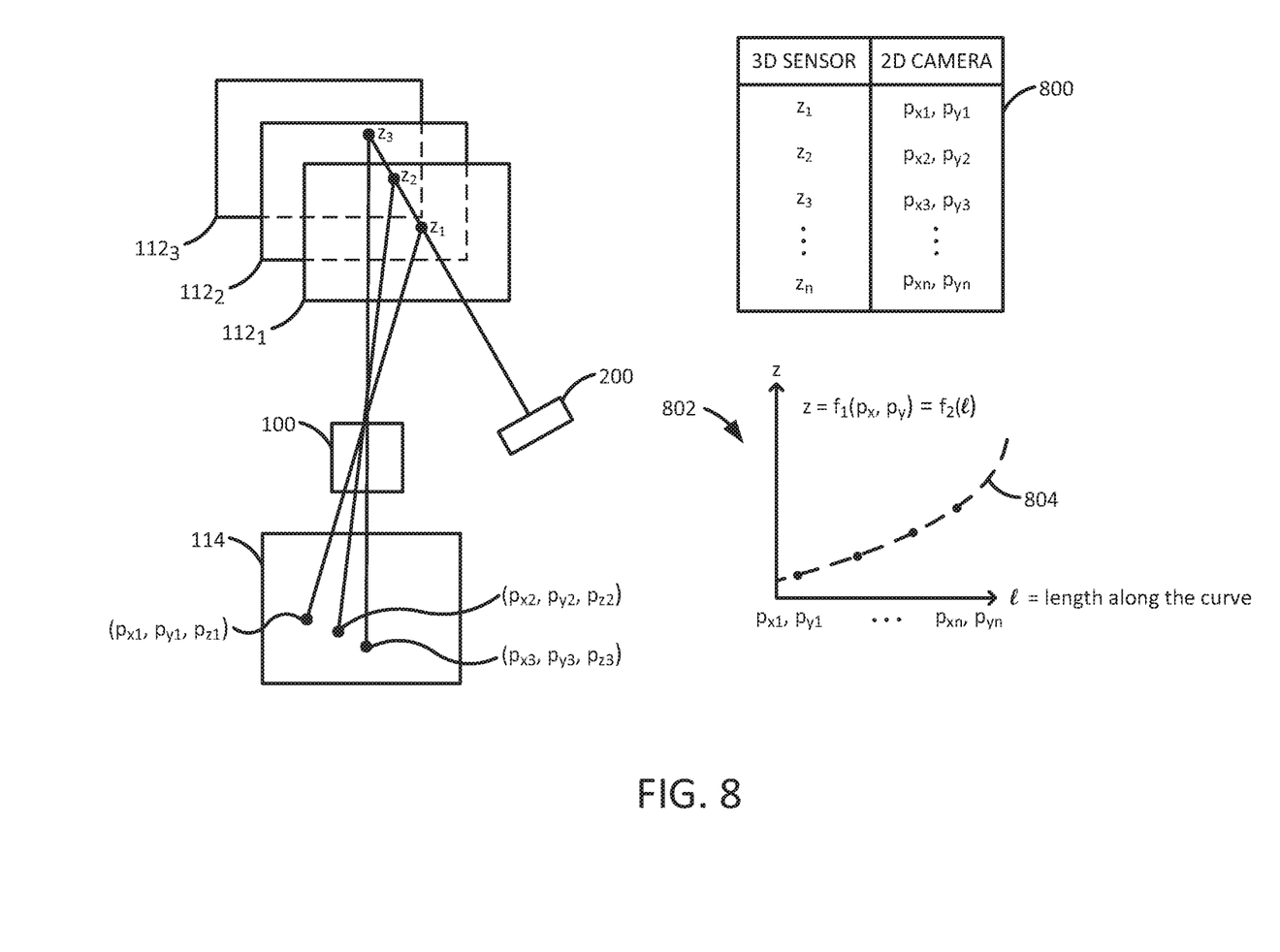
FIG. 8 is a schematic diagram illustrating one example of how the relational expressions derived in method of FIG. 3 may be derived.

FIG. 8 is a schematic diagram illustrating one example of how the relational expressions derived in step 312 of the method 300 may be derived. Similar reference numerals are used for elements that are similar to elements illustrated in FIGS. 1 and 2.

As illustrated in FIG. 8, the target surface 112 may be moved to vary the distance to the to the 3D distance sensor 100, as described above. Each position of the target surface 112 is illustrated as a plane $112_1$-$112_3$ in FIG. 8. Although three planes are shown for ease of explanation and illustration, it will be appreciated that any number of planes (e.g., n planes) may be used. The same point may be imaged on each plane; $z_1$ illustrates the z (linear distance from 3D distance sensor 100) position of the point on the plane $112_1$, $z_2$ illustrates the position of the point on the plane $112_2$, and $z_3$ illustrates the position of the point on the plane $112_3$.

The same point may also be imaged on the image sensor 114; $(p_{x1}, p_{y1}, z_1)$ illustrates the x,y (camera image) position on image sensor 114 for the point in the first plane $112_1$, $(p_{x2}, p_{y2}, z_2)$ illustrates the x,y (planar) position on image sensor 114 for the point in the second plane $112_2$, and $(p_{x3}, p_{y3}, z_3)$ illustrates the x,y (planar) position on image sensor 114 for the point in the third plane $112_3$.

Thus, the z position of a point at various distances from the 3D image sensor 100 may be matched to the corresponding $p_x$, $p_y$ positions at various distances on the image sensor of the 2D camera 200, as illustrated by the chart 800.

In one example, the z position may be plotted against the $p_x$, $p_y$ position for the point in each plane, as illustrated by the plot 802. A curve 804 may be fitted to the data points in the plot 802, where l represents a length along the curve 804. As such, in one example, the $p_x$, $p_y$ position of a given point may be obtained from the z position of the given point by an approximation function f, expressed in one example as:

$$z = f_1(p_x, p_y) = f_2(l) \quad \text{(EQN. 1)}$$

Figure 4:
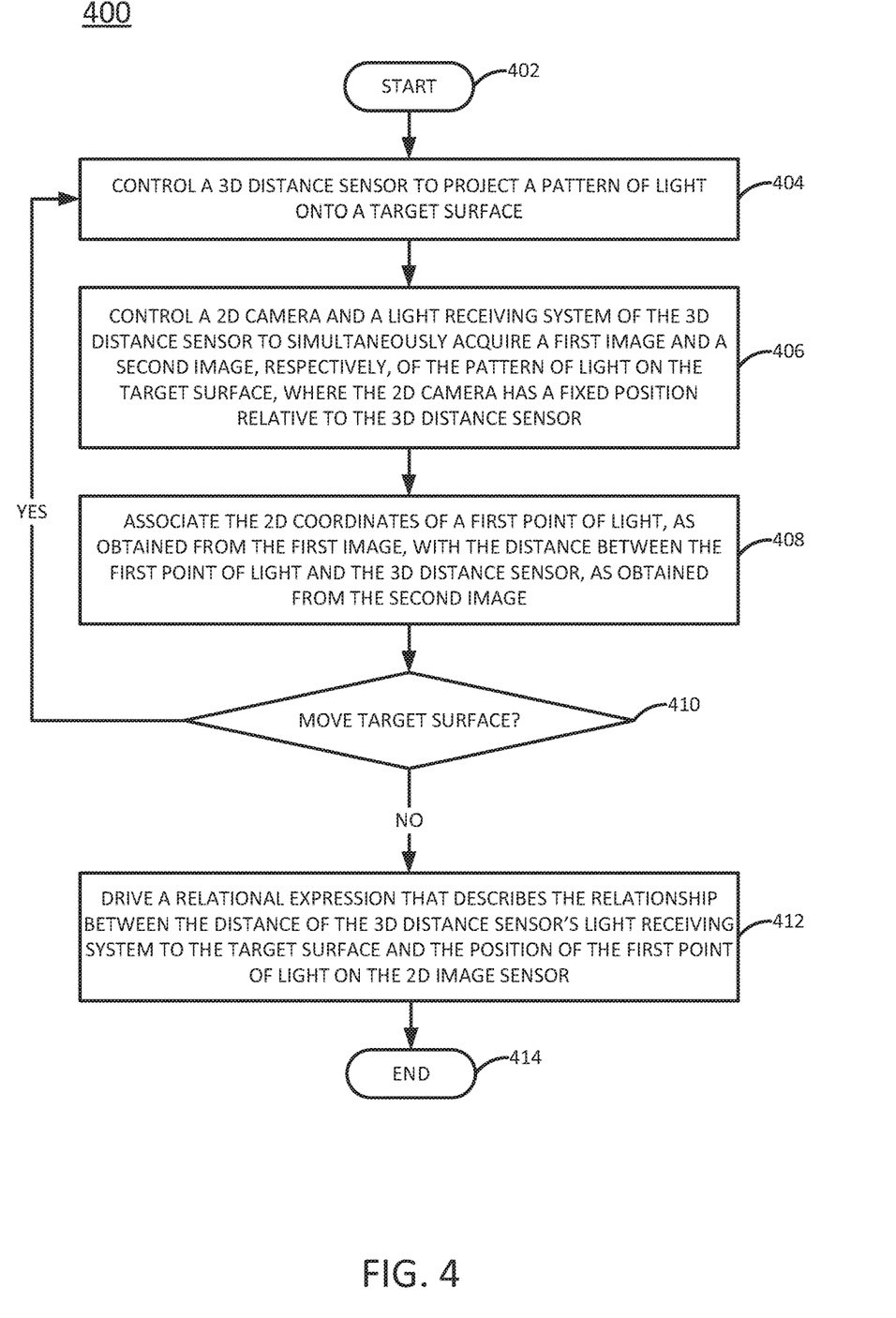
FIG. 4 is a flow diagram illustrating one example of a method for calibrating a system including a three-dimensional distance sensor and a two-dimensional camera, such as the system illustrated in FIG. 2, so that three-dimensional depth map information can be mapped onto a two-dimensional image, according to the present disclosure.

FIG. 4 is a flow diagram illustrating one example of a method 400 for calibrating a system including a three-dimensional distance sensor and a two-dimensional camera, such as the system illustrated in FIG. 2, so that three-dimensional depth map information can be mapped onto a two-dimensional image, according to the present disclosure. The method 400 may be performed after the 3D distance sensor has been calibrated independently of the system, e.g., as described above in connection with FIG. 3.

Figure 7:
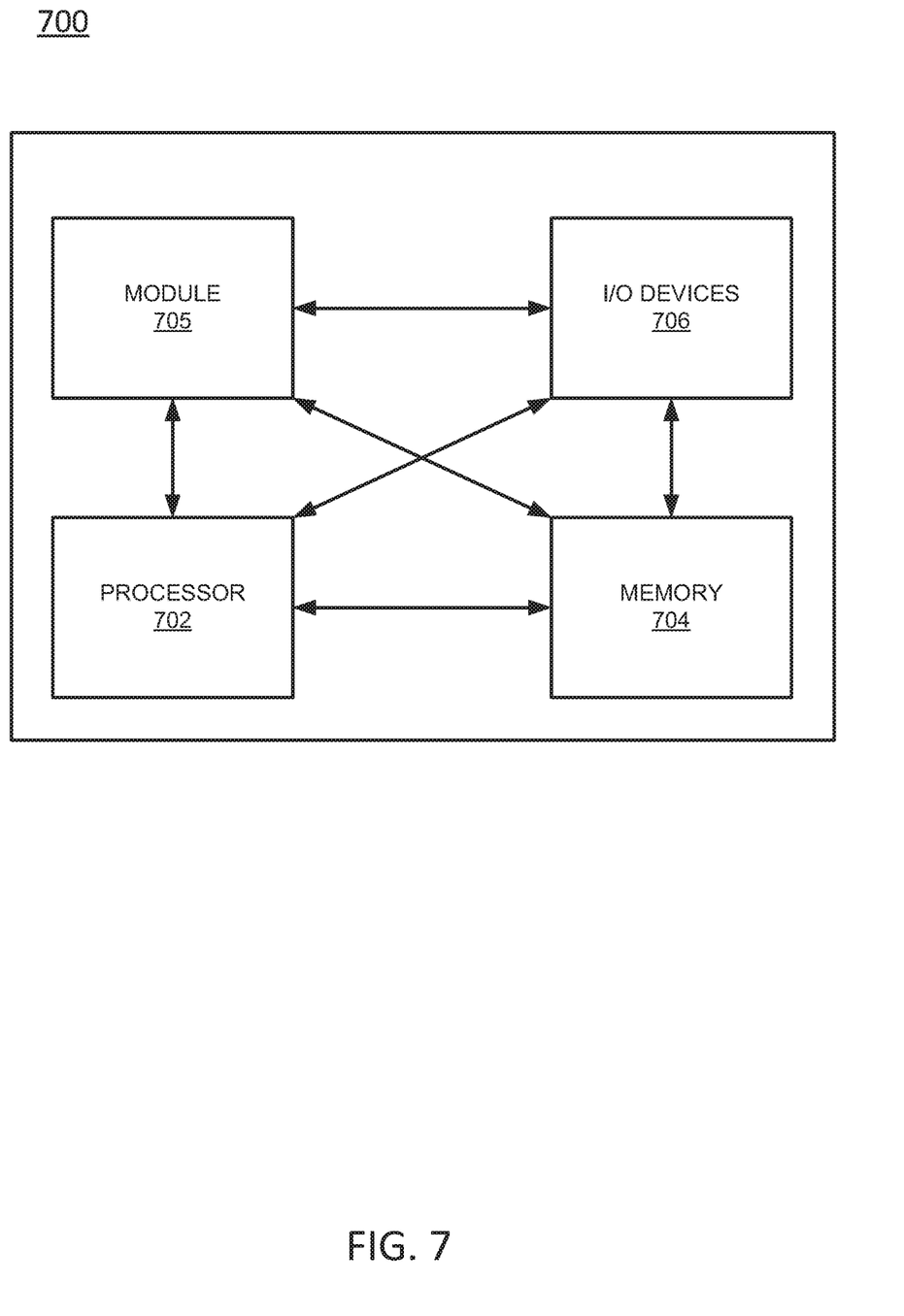
FIG. 7 depicts a high-level block diagram of an example electronic device for mapping three-dimensional depth map data onto two-dimensional images.

The method 400 may be performed, for example, by a processor that is in communication with (and receives image data from) the 3D distance sensor and the 2D camera, such as the processor 702 illustrated in FIG. 7. Alternatively, the method 400 may be performed by a processor that is part of the 3D distance sensor or the 2D camera. For the sake of example, the method 400 is described as being performed by a processing system.

The method 400 may begin in step 402. In step 404, the processing system may control the 3D distance sensor to project a pattern of light onto a target surface. That is, the pattern of light may be the same pattern of light that was used to calibrate the 3D distance sensor (e.g., in accordance with the method 300 described above); however, the target surface onto which the pattern of light is now projected may be a different target surface than the target surface that the three-dimensional target surface used to calibrate the 3D distance sensor. In the case of step 404, the target surface may comprise a two-dimensional target, e.g., such that all portions of the target surface reside at the same distance from the light receiving system of the 3D distance sensor. In one example, the target surface may comprise a planar target. The target surface may also be rectangular in shape to facilitate calibration. Where the pattern of light is created by beams of infrared light, the target surface may comprise an infrared fluorescent material, i.e., a material that emits fluorescence when excited by infrared light.

In step 406, the processing system may control a 2D camera and the light receiving system of the 3D distance sensor to simultaneously acquire a first image and a second image, respectively, of the pattern of light on the target surface, where the 2D camera has a fixed position relative to the 3D distance sensor. That is, the positional relationship between the 3D distance sensor and the 2D camera is fixed. As discussed above, in one example, the 2D camera may include an infrared cut-off filter and a 2D image sensor.

Figure 5A:
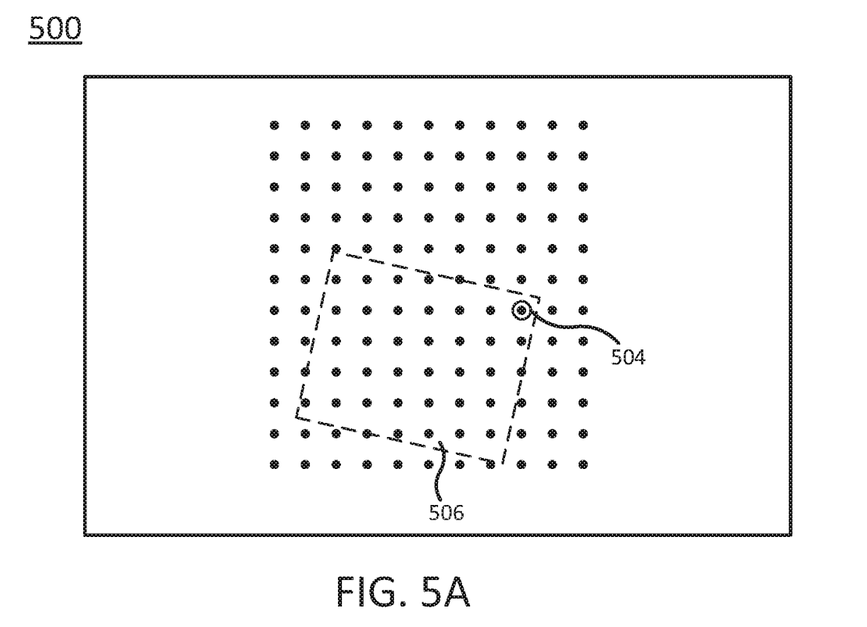
FIG. 5A illustrates an example image that may be captured by the light receiving system of the 3D distance sensor.
Figure 5B:
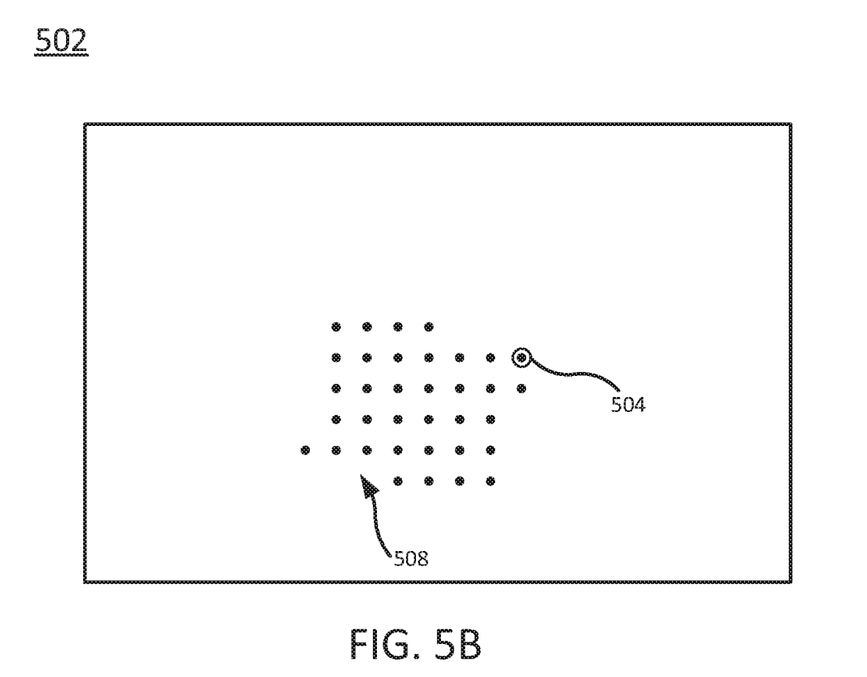
FIG. 5B illustrates an example image that may be captured by the 2D camera.

FIG. 5A, for instance, illustrates an example image 500 that may be captured by the light receiving system of the 3D distance sensor (e.g., a "second image" in accordance with step 406), while FIG. 5B illustrates an example image 502 that may be captured by the 2D camera (e.g., a "first image" in accordance with step 406).

As illustrated, the image 500 may depict the positions of a plurality of points of light of the pattern of light. A subset of the plurality of points of light may be incident upon the target surface (illustrated in dashed lines at 506). Because the image sensor of the 3D distance sensor is able to detect the infrared light emitted by the light projecting system, however, the image 500 may depict even those points of light that are not incident upon the target surface 506.

By contrast, the image 502 may only depict the subset 508 of the plurality of points of light that is incident upon the target surface 506. This is because the image sensor of the 2D camera may only be able to detect the fluorescence that is emitted by the target surface 506 when the infrared light is incident upon the target surface 506, but may not be able to detect the infrared light itself. Thus, the 2D camera may image a smaller portion of the pattern of light than the 3D distance sensor images.

The 2D camera and the 3D distance sensor may capture the first and second images, respectively, of the pattern of light as projected onto the target surface and may transmit the first and second images to the processing system (e.g., via a wired or wireless connection).

In step 408, the processing system may associate the 2D coordinates of a first point of light, as obtained from the first image, with the distance between the first point of light and the 3D distance sensor, as obtained from the second image. That is, the (u, v) coordinates of the first point of light on the 2D image sensor of the 2D camera are associated with the (z) coordinate of the first point of light on the 3D image sensor of the 3D distance sensor to generate a single set of coordinates (u, v, z) for the first point of light. In one example, the first point of light is identified in both the second image and the third image (e.g., identified as the same point of light) based on the relative position of the point of light in the pattern of light. For instance, referring again to FIGS. 5A and 5B, the point of light 504 may be identified as the same point of light in the images 500 and 502 based on the position of the point of light 504 relative to the other points of light.

In step 410, the processing system may determine whether the target surface should be moved. In one example, in order to calibrate the positional relationship between the 3D distance sensor and the 2D camera, steps 404-408 are repeated multiple times, where the target surface is moved each time so that the distance between the target surface and the 3D distance sensor (and between the target surface and the 2D camera) changes.

If the processing system concludes in step 410 that the target surface should be moved to allow for additional measurements, then the method 400 may return to step 404, and the processing system may proceed as described above with the target surface now moved to change the distance.

If, however, the processing system concludes in step 410 that the target surface should not be moved to allow for additional measurements, then the method 400 may proceed to step 412. In step 412, the processing system may derive a relational expression that describes the relationship between the distance of the 3D distance sensor's light receiving system to the target surface (where this distance may change continuously) and the position of the first point of light on the 2D image sensor. In one example, single sets of coordinates, as described in connection with step 408, may be formed for a subset of the plurality of points of light that includes the first point of light and at least one additional point of light.

For instance, where steps 404-408 have been repeated k times (k>1), the relational expression may be derived from a plurality of data points $(u_1, v_1, z_1), (u_2, v_2, z_2), \ldots (u_k, v_k, z_k)$. The relational expression may be stored in a memory that is accessible to the processing system. The relational expression may be derived as described above in connection with EQN. 1.

The method 400 may end in step 414.

Figure 6:
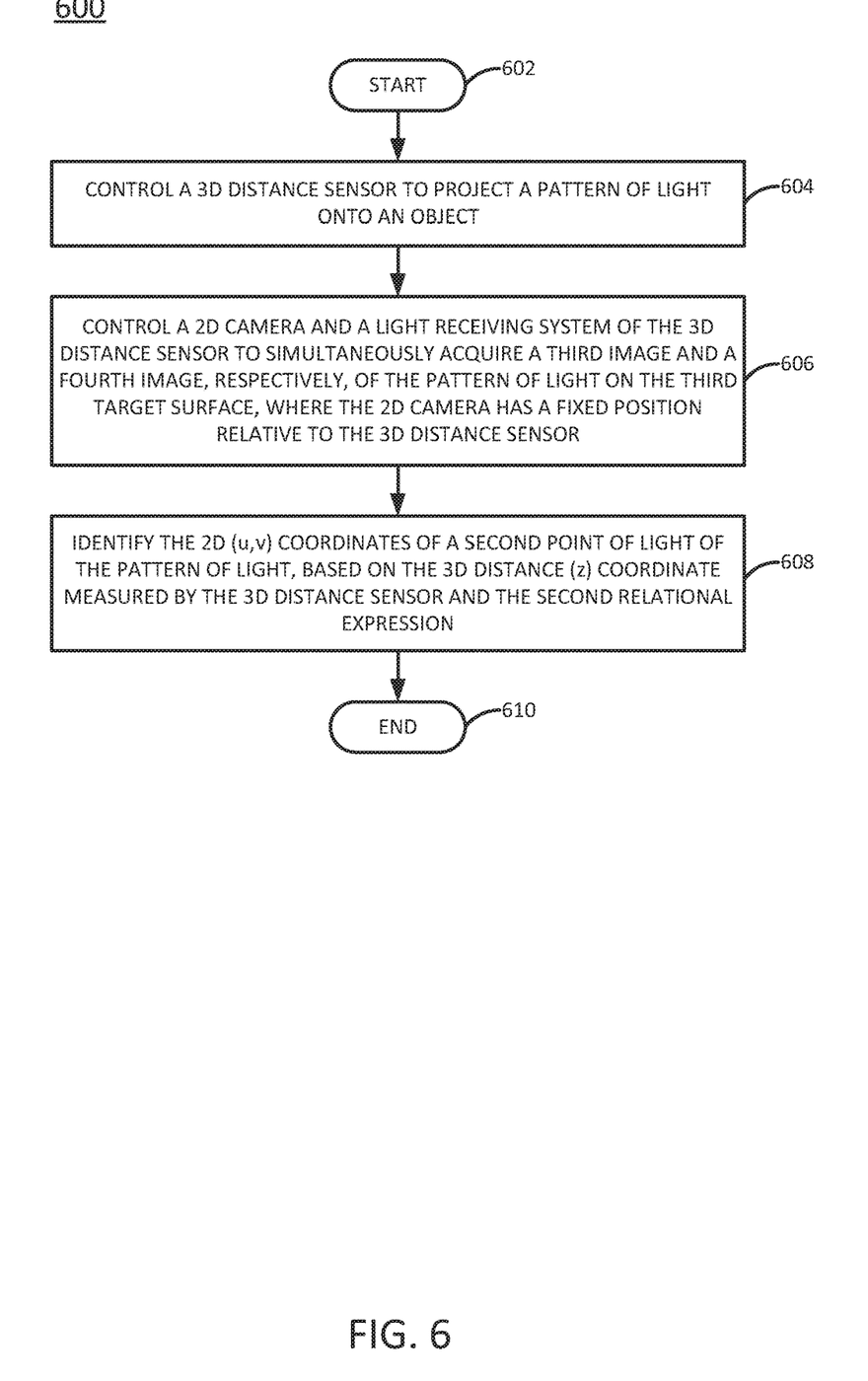
FIG. 6 is a flow diagram illustrating one example of a method for mapping three-dimensional depth map information acquired by a three-dimensional distance sensor onto a two-dimensional image acquired by a two-dimensional camera.

FIG. 6 is a flow diagram illustrating one example of a method 600 for mapping three-dimensional depth map information acquired by a three-dimensional distance sensor onto a two-dimensional image acquired by a two-dimensional camera. The method 600 may be performed, for example, by a processor that is in communication with (and receives image data from) the 3D distance sensor and the 2D camera, such as the processor 702 illustrated in FIG. 7. Alternatively, the method 600 may be performed by a processor that is part of the 3D distance sensor or the 2D camera. For the sake of example, the method 600 is described as being performed by a processing system.

The method 600 may begin in step 602. In step 604, the processing system may control the 3D distance sensor to project a pattern of light onto an object (e.g., an object other than the target surfaces used in the calibration methods 300 and 400). That is the pattern of light may be the same pattern of light that was used to calibrate the 3D distance sensor and the 2D camera (e.g., in accordance with the methods 300 and 400 described above); however, the object onto which the pattern of light is now projected may be a different object that the target surfaces used for calibration. For instance, the object may be an object that is being imaged.

In step 606, the processing system may control the 2D camera and the light receiving system of the 3D distance sensor to simultaneously acquire a third image and a fourth image, respectively, of the pattern of light on the object, where the 2D camera has a fixed position relative to the 3D distance sensor. That is, the positional relationship between the 3D distance sensor and the 2D camera is fixed.

In step 608, the processing system may identify the 2D (u, v) coordinates of a second point of light of the pattern of light, based on the 3D distance (z) coordinate measured by the 3D distance sensor and the second relational expression derived in accordance with the method 400 (i.e., a relational expression that describes the relationship between the distance of the 3D distance sensor's light receiving system to the second target surface and the position of the first point of light on the 2D image sensor).

The method 600 may end in step 610.

In some examples, the 2D camera may have zoom and/or focusing capabilities. In this case, the method 400 may be performed with the lens of the 2D camera set to a fixed value. Any coordinates recorded by the 2D camera are then associated in memory with not just the corresponding 3D coordinates from the 3D distance sensor, but also with the fixed value of the lens setting. The method 400 may be repeated at a plurality of different fixed values for the lens setting, where the specific value used in each iteration of the method 400 is associated with the corresponding coordinates in memory. In this case, any second relational expressions derived may also be associated in memory with the corresponding values of the lens settings.

It should be noted that although not explicitly specified, some of the blocks, functions, or operations of the methods 300, 400, or 600 described above may include storing, displaying and/or outputting for a particular application. In other words, any data, records, fields, and/or intermediate results discussed in the methods 300, 400, or 600 can be stored, displayed, and/or outputted to another device depending on the particular application. Furthermore, blocks, functions, or operations in FIG. 3, 4, or 6 that recite a determining operation, or involve a decision, do not imply that both branches of the determining operation are practiced. In other words, one of the branches of the determining operation may not be performed, depending on the results of the determining operation.

In one example, once the $p_x$, $p_y$ position of a point of light is determined based on the point of light's z position, as described above, the $p_x$, $p_y$, positions of other points of light in the same projection may be easily determined. This is because the spacing between the points of light in the projection pattern is known a priori. For instance, the x and y distances between a given point of light and an adjacent point of light are known before the projection pattern is projected onto an object.

In further examples, a first point of light's $p_x$, $p_y$, z position can be determined using a relatively small target surface whose distance from the 3D distance sensor is varied. For instance, the small target surface may be small enough to ensure that only one point of light of the projection pattern (e.g., the first point of light) is incident on the target surface. Then, once the first point of light's $p_x$, $p_y$, z position is determined, the positions of other points of light in the projection pattern can be determined as described above from the known spacing of projection pattern.

FIG. 7 depicts a high-level block diagram of an example electronic device 700 for mapping 3D depth map data onto 2D images. As such, the electronic device 700 may be implemented as a processor of an electronic device or system, such as a distance sensor.

As depicted in FIG. 7, the electronic device 700 comprises a hardware processor element 702, e.g., a central processing unit (CPU), a microprocessor, or a multi-core processor, a memory 704, e.g., random access memory (RAM) and/or read only memory (ROM), a module 705 for mapping 3D depth map data onto 2D images, and various input/output devices 706, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the electronic device 700 may employ a plurality of processor elements. Furthermore, although one electronic device 700 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 700 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 705 for mapping 3D depth map data onto 2D images, e.g., machine readable instructions can be loaded into memory 704 and executed by hardware processor element 702 to implement the blocks, functions or operations as discussed above in connection with the methods 300, 400, and 600. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 905 for mapping 3D depth map data onto 2D images of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:
1. A method, comprising:
controlling, by a processing system, a three-dimensional distance sensor to project a pattern of light onto a target surface, wherein the pattern of light comprises a plurality of points of light;
controlling, by the processing system, a two-dimensional camera to acquire a first image of the pattern of light on the target surface, wherein the two-dimensional camera has a fixed position relative to the three-dimensional distance sensor;
controlling, by the processing system, a light receiving system of the three-dimensional distance sensor to acquire a second image of the pattern of light on the target surface;
associating, by the processing system, a set of two-dimensional coordinates of a first point of light of the plurality of points of light with a distance coordinate of a set of three-dimensional coordinates of the first point of light to form a single set of coordinates for the first point of light, wherein the set of two-dimensional coordinates is obtained from the first image, and wherein the set of three-dimensional coordinates is obtained from the second image; and
deriving, by the processing system, a relational expression from the single set of coordinates, wherein the relational expression describes a relationship between a distance of the light receiving system to the target surface and a position of the first point of light on an image sensor of the two-dimensional camera.

2. The method of claim 1, wherein the three-dimensional distance sensor is calibrated, prior to controlling the distance sensor to project the pattern of light, using a three-dimensional target.

3. The method of claim 1, wherein the pattern of light comprises infrared light, and the light receiving system includes an infrared bandpass filter.

4. The method of claim 3, wherein the two-dimensional camera includes an infrared cut-off filter.

5. The method of claim 4, wherein the target surface comprises a material that emits fluorescence when the material is excited by infrared light.

6. The method of claim 5, wherein the target surface has a planar shape.

7. The method of claim 1, wherein the first image and the second image are acquired simultaneously by the two-dimensional camera and the three-dimensional distance sensor, respectively.

8. The method of claim 1, wherein the set of two-dimensional coordinates of a first point of light describe a position of the first point of light on an image sensor of the two-dimensional camera.

9. The method of claim 1, wherein the relational expression is derived from single sets of coordinates that are formed for a subset of the plurality of points of light, wherein the subset includes that first point of light and at least one additional point of light.

10. The method of claim 1, wherein the associating comprises identifying, by the processing system, the first point of light in the first image and in the second image based on a position of the first point of light relative to other points of light of the plurality of points of light.

11. The method of claim 1, further comprising, after the associating but prior to the deriving:
    repeating, by the processing system, the controlling the three-dimensional distance sensor to project a pattern of light, the controlling the two-dimensional camera, the controlling the light receiving system of the three-dimensional distance sensor, and the associating, wherein the repeating is performed after the target surface has been moved to alter a distance between the target surface and the three-dimensional distance sensor and a distance between the target surface and the two-dimensional camera.

12. The method of claim 1, further comprising, after the deriving:
    controlling, by the processing system, the two-dimensional camera to acquire a third image of the pattern of light on an object other than the target surface;
    controlling, by the processing system, the light receiving system of the three-dimensional distance sensor to acquire a fourth image of the pattern of light on the object, wherein the third image and the fourth image are acquired simultaneously; and
    identifying, by the processing system, a set of two-dimensional coordinates for a second point of light of the plurality of points of light, based on a three-dimensional distance coordinate of the second point of light measured by the three-dimensional distance sensor and on the relational expression.

13. The method of claim 1, wherein a lens of the two-dimensional camera is set to a fixed value that controls a zoom or focus of the lens.

14. The method of claim 13, wherein the associating includes associating the fixed value with the single set of coordinates.

15. The method of claim 14, further comprising, after the associating but prior to the deriving:
    repeating, by the processing system, the controlling the three-dimensional distance sensor to project a pattern of light, the controlling the two-dimensional camera, the controlling the light receiving system of the three-dimensional distance sensor, and the associating, wherein the repeating is performed after the fixed value has been set to a new fixed value.

16. A non-transitory machine-readable storage medium encoded with instructions executable by a processor, wherein, when executed, the instructions cause the processor to perform operations, the operations comprising:
    controlling a three-dimensional distance sensor to project a pattern of light onto a target surface, wherein the pattern of light comprises a plurality of points of light;
    controlling a two-dimensional camera to acquire a first image of the pattern of light on the target surface, wherein the two-dimensional camera has a fixed position relative to the three-dimensional distance sensor;
    controlling a light receiving system of the three-dimensional distance sensor to acquire a second image of the pattern of light on the target surface;
    associating a set of two-dimensional coordinates of a first point of light of the plurality of points of light with a distance coordinate of a set of three-dimensional coordinates of the first point of light to form a single set of coordinates for the first point of light, wherein the set of two-dimensional coordinates is obtained from the first image, and wherein the set of three-dimensional coordinates is obtained from the second image; and
    deriving a relational expression from the single set of coordinates, wherein the relational expression describes a relationship between a distance of the light receiving system to the target surface and a position of the first point of light on an image sensor of the two-dimensional camera.

17. The non-transitory machine-readable storage medium of claim 16, wherein the pattern of light comprises infrared light, wherein the light receiving system includes an infrared bandpass filter, and wherein the two-dimensional camera includes an infrared cut-off filter.

18. The non-transitory machine-readable storage medium of claim 17, wherein the target surface comprises a material that emits fluorescence when the material is excited by infrared light.

19. The non-transitory machine-readable storage medium of claim 16, further comprising, after the deriving:
    controlling the two-dimensional camera to acquire a third image of the pattern of light on an object other than the target surface;
    controlling the light receiving system of the three-dimensional distance sensor to acquire a fourth image of the pattern of light on the object, wherein the third image and the fourth image are acquired simultaneously; and
    identifying a set of two-dimensional coordinates for a second point of light of the plurality of points of light, based on a three-dimensional distance coordinate of the second point of light measured by the three-dimensional distance sensor and on the relational expression.

20. An apparatus, comprising:
a processor; and
a non-transitory machine-readable storage medium encoded with instructions executable by a processor, wherein, when executed, the instructions cause the processor to perform operations, the operations comprising:

controlling a three-dimensional distance sensor to project a pattern of light onto a target surface, wherein the pattern of light comprises a plurality of points of light;

controlling a two-dimensional camera to acquire a first image of the pattern of light on the target surface, wherein the two-dimensional camera has a fixed position relative to the three-dimensional distance sensor;

controlling a light receiving system of the three-dimensional distance sensor to acquire a second image of the pattern of light on the target surface;

associating a set of two-dimensional coordinates of a first point of light of the plurality of points of light with a distance coordinate of a set of three-dimensional coordinates of the first point of light to form a single set of coordinates for the first point of light, wherein the set of two-dimensional coordinates is obtained from the first image, and wherein the set of three-dimensional coordinates is obtained from the second image; and deriving a relational expression from the single set of coordinates, wherein the relational expression describes a relationship between a distance of the light receiving system to the target surface and a position of the first point of light on an image sensor of the two-dimensional camera.

\* \* \* \* \*